Dec. 27, 1966 E. T. HEALD 3,294,907

SYNCHRONIZING SIGNAL DERIVING MEANS

Filed Oct. 3, 1963 5 Sheets-Sheet 1

INVENTOR.
EARL T. HEALD

BY *Moody and Phillion*

ATTORNEYS

Dec. 27, 1966 E. T. HEALD 3,294,907

SYNCHRONIZING SIGNAL DERIVING MEANS

Filed Oct. 3, 1963 5 Sheets-Sheet 2

INVENTOR.
EARL T. HEALD
BY Moody and Phillion
ATTORNEYS

SYNCHRONIZING SIGNAL DERIVING MEANS

Filed Oct. 3, 1963 5 Sheets-Sheet 3

INVENTOR.
EARL T. HEALD
BY
Moody and Phillips
ATTORNEYS

INVENTOR.
EARL T. HEALD
BY
Moody and Phillips
ATTORNEYS

INVENTOR.
EARL T. HEALD
BY
Moody and Phillion
ATTORNEYS

United States Patent Office 3,294,907 Patented Dec. 27, 1966

3,294,907

SYNCHRONIZING SIGNAL DERIVING MEANS

Earl T. Heald, Richardson, Tex., assignor to Collins Radio Company, Cedar Rapids, Iowa, a corporation of Iowa Filed Oct. 3, 1963, Ser. No. 313,607
6 Claims. (Cl. 178—67)

This invention relates generally to the derivation of a synchronizing signal from a received intelligence bearing signal and, more particularly, to a means for deriving a synchronizing signal directly from a received time synchronous signal consisting of a plurality of tones, each consisting of a series of time-synchronous consecutive pulse bursts whose phases vary in accordance with the particular information carried in the pulse burst.

The transmission of information by employing time synchronously divided tone signals into a series of consecutive pulse bursts having different phases to represent information is fairly well developed. More specifically, in time-synchronous systems each bit of information is carried on a tone signal and occurs during a given interval of time, with said intervals of time being equal in length and occurring consecutively in time. The phase of the tone signal during each bit determines the information carried by the tone signal with respect to some reference phase, usually the phase of the tone signal during the immediately preceding time interval. The name given to each of these bits occurring during said short intervals of tone signals is "phasor." Thus, the phase of each phasor is usually compared to the phase of the immediately preceding phasor to determine the information contained in the given phasor. As will be described later herein, each tone signal may carry more than one channel of information. For example, if a single channel of information is being carried on a single tone, a phase difference of 180° between two phasors can be employed to represent a mark or a space. In other words, if a given phasor is arbitrarily said to have a phase of zero degrees and represents a mark, then a next subsequent phasor, 180° removed therefrom, will represent a space. If two channels of information are contained on the tone signal, then it is necessary to have four possible phasor positions, each possible position representing some combination of a mark or a space of a first channel and a mark or a space of a second channel. These four possible phase positions should be spaced 90° apart to obtain optimum operating conditions. For a detailed discussion of such a system, reference is made to U.S. Patent 2,905,812 issued September 22, 1959, to Melvin L. Doelz et al. and entitled "High Information Capacity Phase Pulse Multiplex System."

It is also possible to transmit several tones simultaneously, with each tone containing one, two, or more channels, and each tone having identical time-synchronous divisions, i.e., with the phase transitions of each tone signal occurring simultaneously. Such systems of transmitting information require a transmitting station and a receiving station with the phasors being produced on the plurality of tone signals produced at the transmitting station. At the receiver the various tone signals are separated by appropriate filtering means and demodulated to reproduce the information contained in each channel on each tone signal. In general, the demodulation is effected in the following manner. A particular tone signal is selected by filtering means constructed to respond only to that particular tone signal. Such filtering means can consist of means for storing a given phasor during the time that the next succeeding phasor is being received. The phase of said next succeeding phasor is then compared with the phase of the stored phasor to determine the information contained in the said next succeeding phasor. Subsequently, the said preceding phasor is stored and then the following received phasor is compared with the phase of that next preceding phasor to determine the information stored therein. In such a manner the information contained in each phasor is determined by the relation of its phase to the phase of the immediately preceding phasor. However, in order to accomplish such demodulation, it is necessary to determine the precise times that the phase transition between bits occurs. In other words, an accurate synchronizing signal which can indicate the phase transition times of the received bits must be reproduced at the receiver. Various methods have been developed to provide such a synchronizing signal. Included in these methods are individual synchronizing tones which are transmitted along with the information-carrying signal. Such separate synchronizing tones can be compared at the receiver with the received information-carrying signal to reproduce the transmitted information. More specifically, the comparison of the separate synchronizing tone and the information-carrying signal can be employed to detect the frequnecy shift of the information-carrying signals.

Another prior art means for obtaining a synchronizing signal is to detect the shift in phase in the composite wave. However, the foregoing methods of obtaining a synchronizing signal have disadvantages. Specifically, the transmission of a separate tone signal obviously requires additional bandwidth and, further, must rely upon the quality of the signal-to-noise ratio of the information-carrying signal for accuracy. Similarly, the variation of a sync signal by means of detecting frequency or phase shift in a composite wave is subject to inaccuracies due to distortion in the received tone signal.

Reference will now be made to a particular characteristic of this type of data transmission which provides the basis for the present invention. It has been found that if a plurality of tone signals are each spaced apart by a difference frequency which bears a certain relationship to the frequency of the lowest tone signal in the group of tone signals, then the composite waveform will reproduce itself exactly at predetermined time intervals. If such predetermined time intervals are less than the bit period, then during each bit period there are two portions of the composite wave signal which are identical. By delaying the received composite signal, that is, the signal containing all of the tone signals, by the proper time interval, correlation can be obtained between these identical portions of a bit. Such correlation means provides the basis in the present invention for the generation of a synchronizing signal at the receiver directly from the received composite signal.

The particular relationship required between the frequencies of the various signal tones are, firstly, that the frequency of the lowest tone signal be an integral multiple of the difference frequency between the signal tones and, secondly, that the period of the difference frequency be less than the period of a bit.

In accordance with the invention there is provided at the receiver means for delaying the composite received signal, including all the signal tones, by a time interval equal to the period of the difference frequency between the tone signals. A correlation subtracter is provided to compare the delayed received composite signal and the undelayed composite signal to produce an output signal which represents the difference between the said two compared signals. Such a difference signal produces a well-defined null during the time correlation exists between the delayed and the undelayed composite signal. Such nulls appear once during each bit and have a frequency exactly equal to the bit rate of the received composite signal and a constant and known phase relationship with the transition times of the bits of the composite signal.

Other circuit means are provided to respond to the null outputs from the correlation subtracter to provide proper synchronization by means of time base generating means employed to operate the receiver.

A feature of the invention is the fact that the synchronizing signal is generated at the receiver without the aid of any information other than the intelligence bearing information.

The above-mentioned and other objects and features of the invention will be more fully understood from the following detailed description thereof when read in conjunction with the drawings in which.

Figure 7:
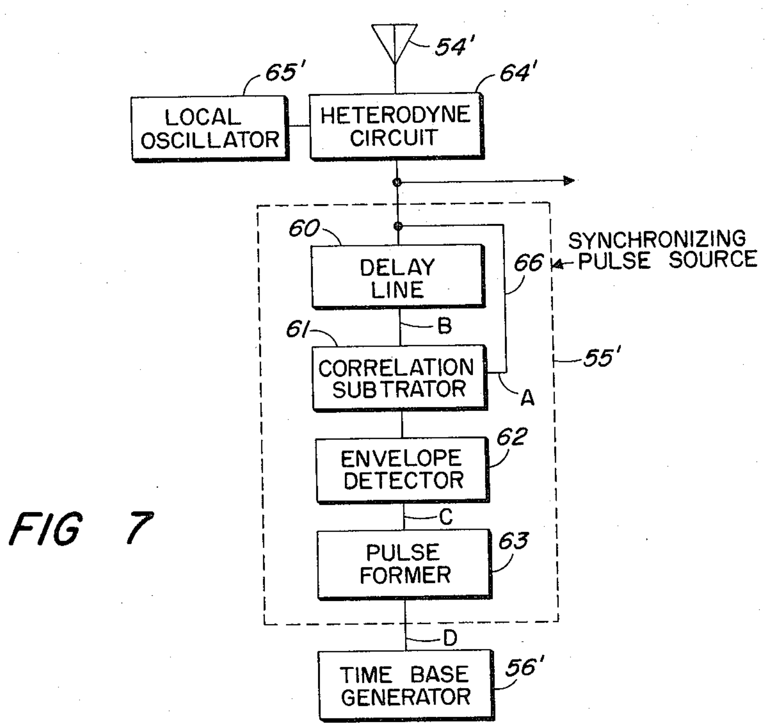
FIGS. 7 and 9 show the essence of the invention in block diagram form.
Figure 8:
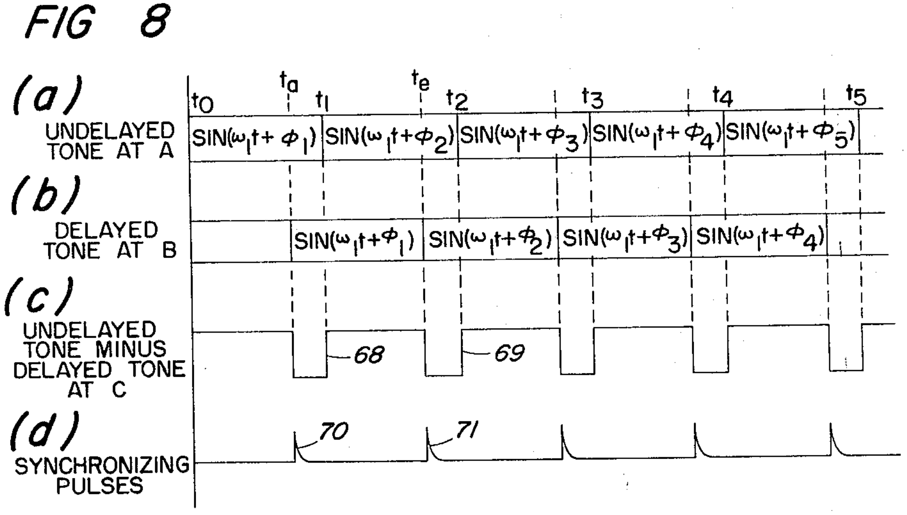
FIG. 8 is a group of waveforms symbolically illustrating how the periodicity of the composite waveform, during a single bit time, is utilized to produce a synchronizing signal.
Figure 9:
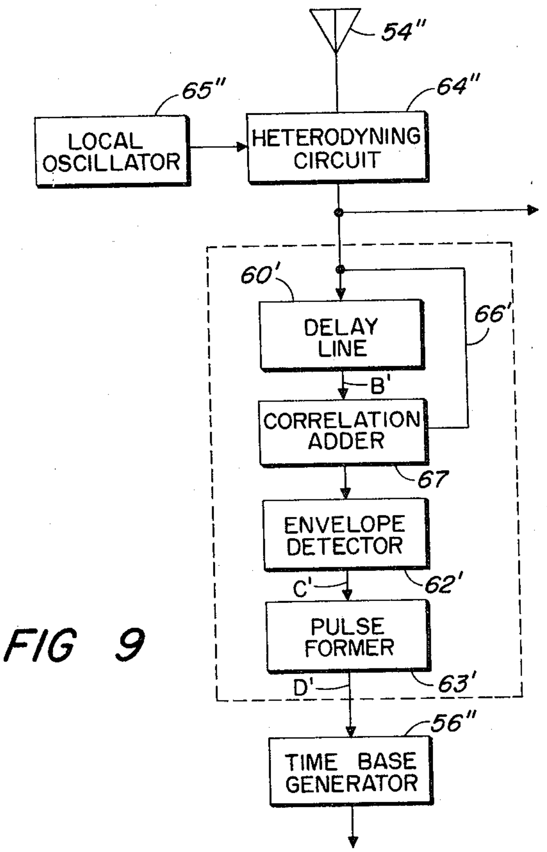

In order to fully understand the present invention, it is desirable to discuss briefly some of the structure needed to generate the time-synchronous phasors and some of the structure needed to receive and demodulate the time-synchronous phasors. More specifically, FIGS. 1, 2, 3, 4, 5, and 6 constitute prior art and exist in the specification only for the purpose of providing the reader with the necessary background to understand the improvement which is shown in FIGS. 7, 8, and 9. Only a brief description of the means for transmitting and receiving composite signal will be given, however. For a detailed discussion of such structure, reference is made to the aforementioned U.S. Patent 2,905,812.

Figure 1:
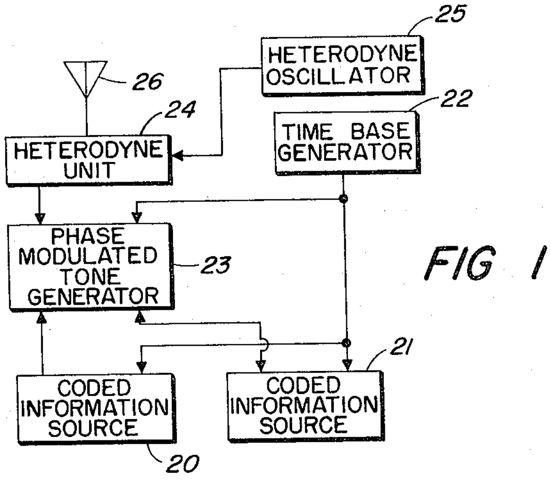
FIG. 1 shows a schematic diagram of a means for generating and transmitting a single tone, phase modulated to produce the time-synchronous phasors.
Figure 2:
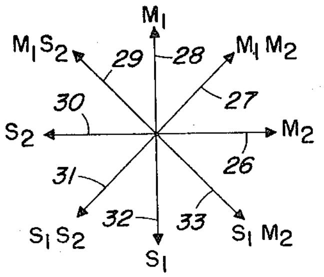
FIG. 2 is a vector diagram showing the phasors generated by the structure of FIG. 1.

Referring now to FIG. 1, coded information is generated in information sources 20 an 21 under control of time base 22. The two information sources 20 and 21 represent two separate channels of information, which are supplied to phase modulated tone generator 23 wherein the time-synchronous phasors, such as shown in vector form in FIG. 2, are generated in accordance with the particular coded information supplied thereto. The phasors of FIG. 2 may have a frequency of 20,000 cycles per second or some other frequency in the audio or near audio length. For purposes of transmission, the phasor outputs of the phase modulated tone generator are supplied to the heterodyning unit 24 which, in co-operation with the oscillator 25, functions to heterodyne the phasors to a higher frequency more suitable for transmission purposes. Transmission is effected from antenna 26.

In the vector diagram of FIG. 2, the four phasors 27, 29, 31, and 33 represent the four possible combinations of marks and spaces in the two channels supplied from sources 20 and 21. The vectors are formed generally in the following manner. Assume that both source 20 and source 21 are supplying a mark to tone generator 23. Such marks are represented by vectors 28 and 26, which when combined in the tone generator 23 produce a resultant vector 27. The phase of vector 27 is always determined with respect to the phase of the immediately preceding phasor, which phase can arbitrarily be said to coincide with the phase position of vector $M_2$. Thus, when the next subsequent phasor is generated, the phasor $M_1$ $M_2$ will become the reference phase. If said next subsequent phasor contains a mark in channel I and a space in channel II as represented by vector 29, then the phase difference between vector 27 and vector 29 must be 135°. In other words, each vector serves two purposes. When it is first generated it will carry intelligent information, which information is determined by phase of said vector with respect to the reference phase bit. Then, said vector performs a subsequent function in that it becomes the reference phase for the next succeeding phasor. For this reason, the actual phase difference between a vector representing $M_1$ and $M_2$ and a subsequent vector representing $M_1$ and $S_2$ is 135° rather than the 90° shown in FIG. 2. The vector diagram of FIG. 2 shows only the possible vector positions at any given instant of time and does not show the second function (as a phase reference) of each phasor.

Figure 3:
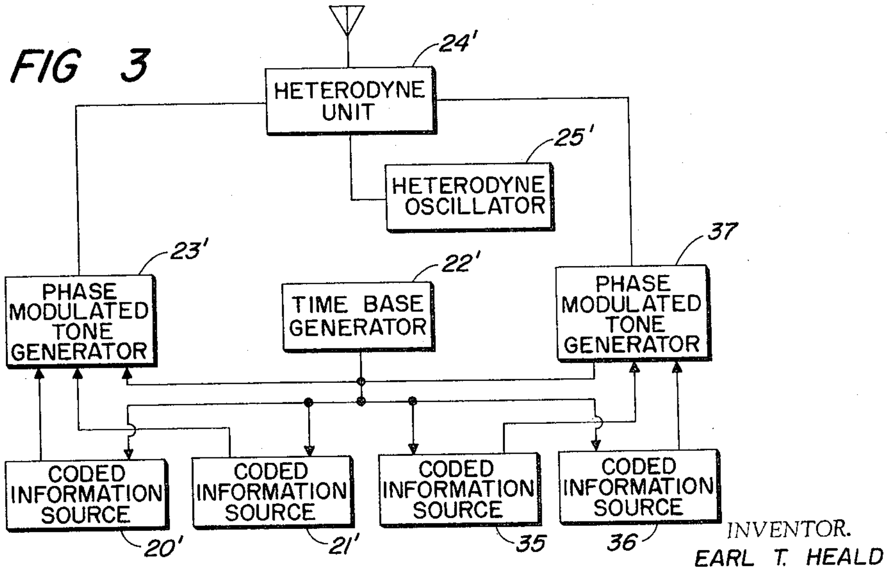
FIG. 3 is another block diagram illustrating generally how a plurality of tone signals may be generated and transmitted.
Figure 4:
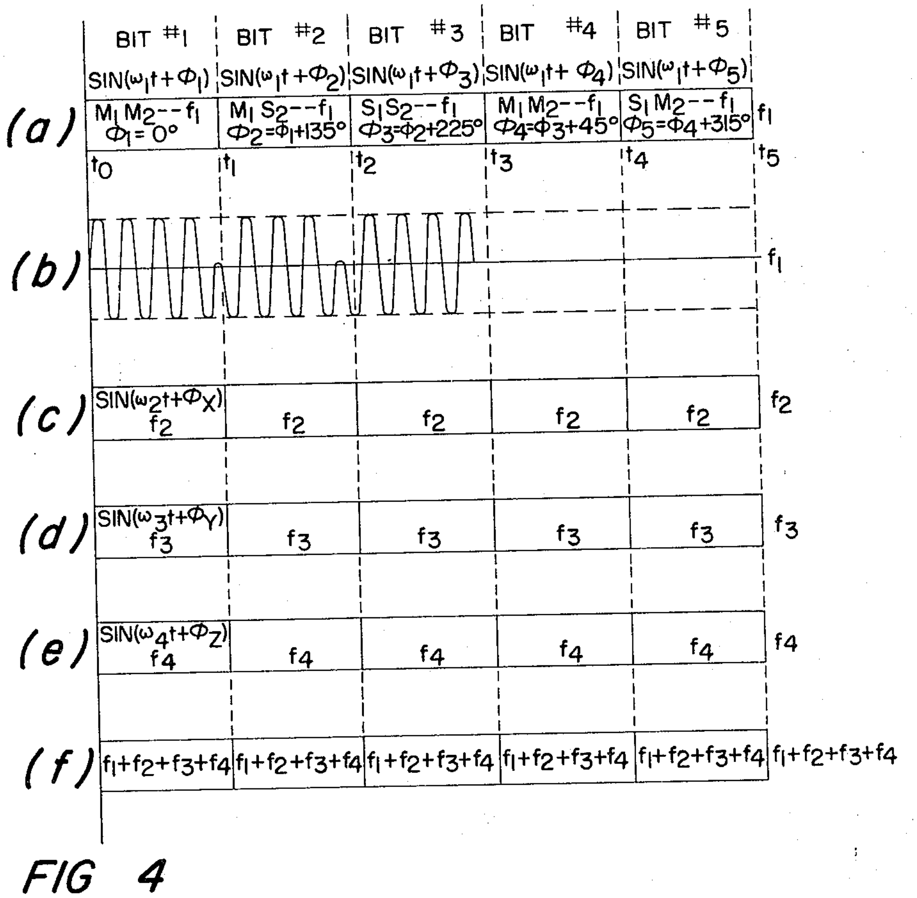
FIG. 4 is a series of symbolically represented waveforms showing how the various tone signals are combined to produce a composite signal of separate tone signals with the same time base.

In FIG. 3 there is shown a block diagram of another transmitter in which two tone signals are employed. More specifically, the phase modulated tone generator 23' functions to generate one tone signal having two channels, or more, of information encoded thereon, and a tone generator 37 responds to input signals from sources 35 and 36 to produce a second tone signal having two or more channels of information encoded thereon. The two tone signals are combined in heterodyne unit 24' where the frequency is increased for transmission purposes. In a similar manner, additional tone signals can be generated and supplied to the heterodyne unit where they are combined and transmitted. It is to be understood, of course, that the bit rate of the phasors of all the tone signals must be time coincident.

In FIGS. 4*a*, 4*c*, 4*d*, and 4*e* there are shown four different tone signals having frequencies $f_1$, $f_2$, $f_3$, and $f_4$, respectively, and having a common time base. The four tone signals are divided into equal time divisions to provide time-synchronous operation. In the manner discussed above in connection with the vector diagram of FIG. 2, the phase of each of the tone signals varies; changing at times $t_0$, $t_1$, $t_2$, $t_3$, $t_4$, and $t_5$ in accordance with the information contained therein. For the puropse of illustration, in FIG. 4*a* the changes in phase of the tone signal as a result of various combinations of marks and spaces from the two channels is shown. For example, phasor #2 which contains a mark in channel I and a space in channel II is advanced from the phase of bit 1 by 135°, as was discussed supra in connection with the vector diagram of FIG. 2. Phasor #3, which contains spaces in both channels I and II is advanced 225° from the phasor of bit #2.

The curve 4*b* shows the actual waveforms of the phasors represented symbolically in FIG. 4*a*.

In the generation of the composite signal to be transmitted, all of the tone signals of FIGS. 4*a*, 4*c*, 4*d*, and 4*e* are combined. FIG. 4*f* symbolically shows such combination of all the tone signals.

Figure 5:
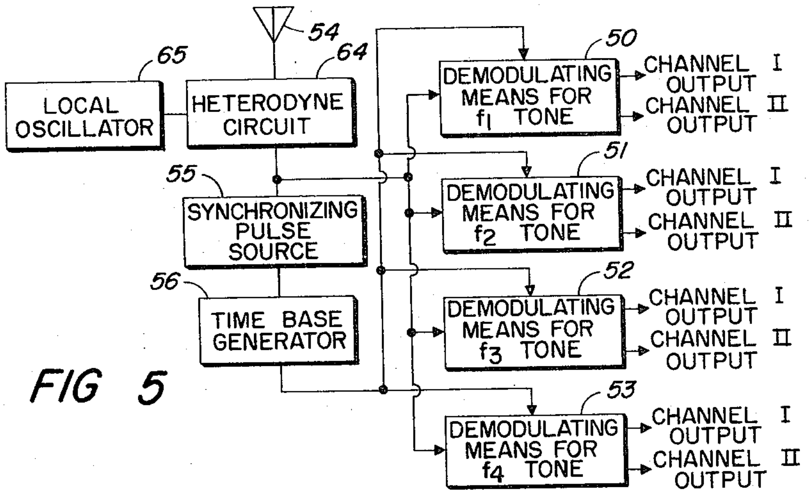
FIG. 5 is a general block diagram showing means for receiving the composite signal.

Referring now to FIG. 5, there is shown a block diagram means for receiving the transmitted composite signal. More specifically, the modulator means 50, 51, 52, and 53 are each adapted to demodulate one of the signal tones having frequencies $f_1$, $f_2$, $f_3$, and $f_4$, respectively. The composite signal received by the antenna 54 also is supplied to a synchronizing pulse generating source 55 which in FIGS. 7, 8, and 9 is discussed in detail since it forms the essence of the invention. Each demodulator means, such as demodulator means 50, contains a pair of keyed filter means which receives alternate phasors of the tone signal to which it is tuned. In the particular case of demodulator means 50, the tone signal to which the keyed filters are tuned has a frequency of $f_1$. A keyed filter means, which is not shown in the drawings in detail, is basically an energy integrator which responds to the incoming phasor to build up an oscillation having a frequency and phase substantially identical to the frequency and phase of the received phasor. The keyed filter which has just received a phasor is then disconnected from the incoming signal and allowed to resonate freely for most of the period of the next phasor. The other keyed filter of the pair is then gated on to receive said next phasor bit and, in turn, responds thereto to assume the frequency and phase of said next bit. The phase of the resonating signal of the second keyed filter can now be compared with the phase of the ringing signal stored in the first keyed filter to determine the information contained in the signal present in the second keyed filter. The third phasor is received by the first keyed filter and then compared with the phase of the second phasor which is now freely resonating in the second keyed filter.

Figure 6:
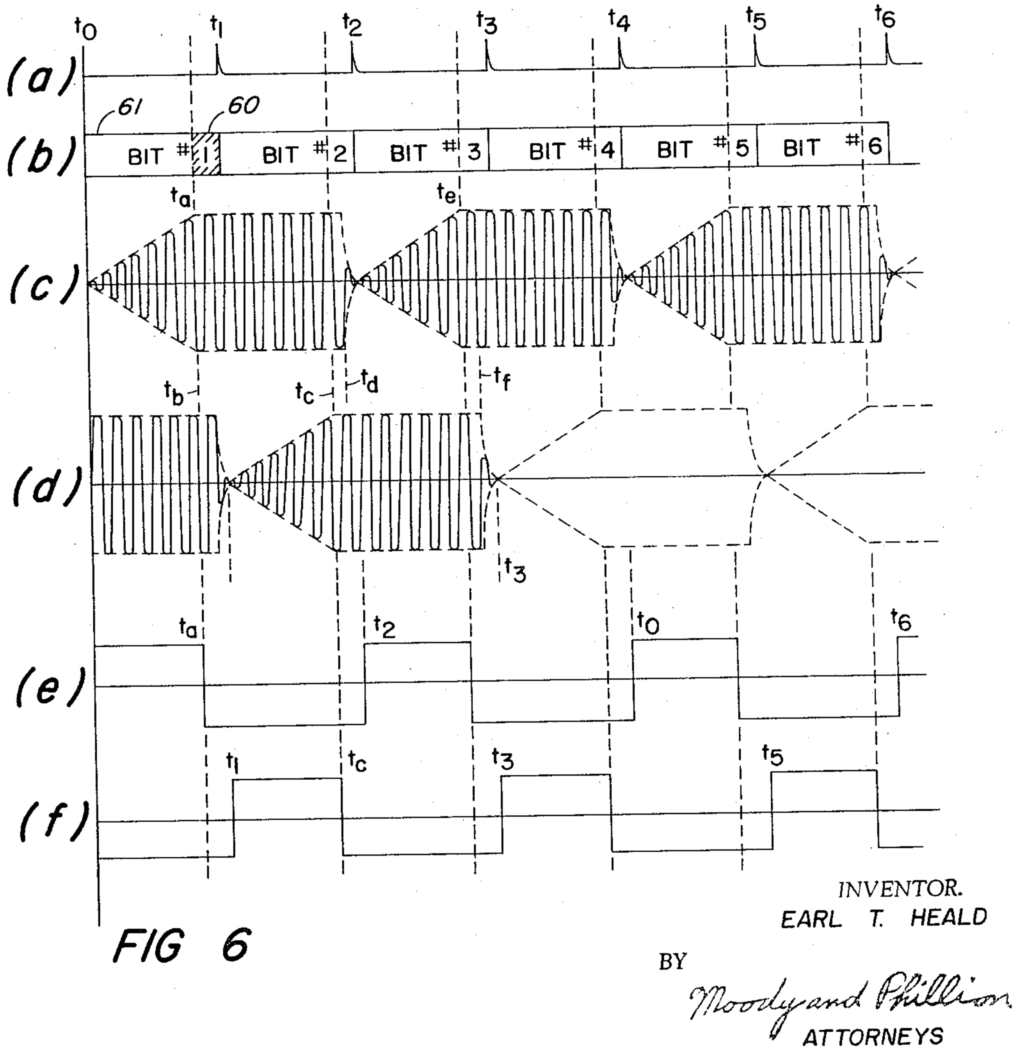
FIG. 6 is a series of waveforms illustrating, generally, how the demodulation is effected and the necessity for having an accurate synchronizing signal at the receiver to enable such demodulation.

Referring to FIG. 6, assume that the first keyed filter receives bit #1 at time $t_0$ and responds thereto to build up a signal during the time period $t_0$—$t_a$, as shown in FIG. 6*c*. At time $t_a$ the first keyed filter is disconnected from the received signal and allowed to ring freely until time $t_d$, at which time it is quenched. At time $t_1$, when the next bit is received, the second keyed filter is connected to the incoming received signal and in response to bit #2 will build up a resonant signal, as shown in FIG. 6*d* during time interval $t_0$—$t_c$. At time $t_c$ the second keyed filter is disconnected from the received bit and allowed to resonate freely until time $t_f$. During the short interval of time $t_c$—$t_d$, the signals in the two keyed filters, shown in waveforms 6*c* and 6*d*, are compared to determine the information contained in the waveform of FIG. 6*d*.

At time $t_2$, when bit #3 is received, the first keyed filter is again connected to the input signal so that it will build up a resonant signal therein, as shown in FIG. 6*c* during time interval $t_2$—$t_e$. The phase of such resonant signal is then compared to the freely ringing signal in the second keyed filter, shown in FIG. 6*d*, to determine the information contained in the first keyed filter; that is, in bit #3. Curves 6*e* and 6*f*, respectively, show the gating or driving signals associated respectively with the first and second keyed filters. More specifically, FIG. 6*e*, when in its upper level, as shown between times $t_0$ and $t_a$ for example, will gate incoming bit #1 to the first keyed filter to produce the linearly increasing oscillation in keyed filter 1, as shown in FIG. 6*c* during time interval $t_0$—$t_a$.

The waveform of FIG. 6*f* gates the second keyed filter and, as shown during time interval $t_1$—$t_c$, gates incoming bit #2 to the second keyed filter to produce a linearly increasing oscillation therein.

From the foregoing, it is apparent that a precise knowledge of the phase transition time between phasors is necessary. As will be noted from the curves of FIG. 6, the time length of a bit is greater than the drive time of the keyed filter. For example, the drive time of the keyed filter 1 during reception of bit 1 is the time interval $t_0$—$t_a$, whereas the bit length is $t_0$—$t_1$. The time interval $t_a$—$t_b$ permits comparison of the phase of the signals in the two keyed filters. Quenching of the signal in the second keyed filter occurs during the time interval $t_b$—$t_1$.

As discussed in U.S. Patent 2,905,812, with proper frequency spacing between the various tone signals and with the proper relationship between such frequency spacing and the lowest tone signal, there is a point in time where all of the tone signals will null out (i.e., where the integration of energy in the keyed filter will equal zero), except in the case of the particular tone signal being selected. The point in time where such null occurs determines the drive time of the keyed filter. In other words, the keyed filter is driven until such null occurs, at which time the keyed filter is disconnected from the received bit so that all the tone signals, except the one being selected, have nulled out and will not appear in the signal present in the keyed filter. Thus, at time $t_a$, the only signal appearing in the keyed filter receiving bit #1 is the tone signal having a frequency $f_1$ to which the keyed filter is tuned. It is to be understood that there will exist at time $t_a$, in the received composite signal, full amplitude signals of all the tone signals being received. However, at time $t_a$, the total integrated energy for all the tone signals, except the one having a frequency $f_1$, is equal to zero.

At time $t_a$, however, the phase relationship of all the tone signals being transmitted will be precisely the same as at time $t_0$. Thus, the waveform in the shaded area 60 in FIG. 6*b* will be an exact duplication of the waveform in the shaded area 61 of FIG. 6*b*. A similar correlation exists in all of the other bits of the received tone signals. Consequently, if bit #1, for example, is delayed by a time interval $t_0$—$t_a$ and then compared with the original undelayed bit #1 signal, an exact correlation between the signals overlapping during the time interval $t_a$—$t_1$ will occur. Such correlation will occur for each bit, thus establishing a pattern of re-occurring periods of correlation which can be detected to produce a synchronizing signal having a frequency equal to the bit rate of the received signal.

In FIG. 8*a* there is shown symbolically an undelayed tone signal, and in FIG. 8*b* there is shown the same tone signal delayed by a time interval $t_0$—$t_a$. The manner in which the time interval $t_0$—$t_a$ is determined is discussed below.

All the tone signals must be delayed an integral number of cycles (or half cycles) if a subtraction of the delayed composite signal from the undelayed composite signal is to provide a zero amplitude in the bit overlap portion (time interval $t_a$—$t_1$). Preparatory to deriving the length of the delay, the following parameters will first be defined:

$T_d=(t_0—t_a)$=time delay in the delay line;

$f_n$=data tone frequencies where $n$ equals 1 is the lowest frequency;

$N$=number of cycles of $f_1$ in the delay period.

$f_s$=data tone spacing: therefore, $f_2=f_1+f_s$, etc.

Consider first the case where the data tones are all delayed an integral number of cycles. Under such circumstances, the following expression can be written:

$$N=T_d f_1=\text{an integer} \quad (1)$$

Now, if $f_2$ is also to be delayed an integral number of cycles, the shortest time delay will occur when there are $N+1$ cycles of frequency $f_2$ in the time delay period $T_D$. The following expression can then be written:

$$(N+1)=T_D(f_2)=T_D(f_1+f_s)=\text{integer} \quad (2)$$

Simultaneous solution of the above two equations yields the following results:

$$N=T_D f_1 \quad (3)$$

$$T_D=\frac{N+1}{f_1+f_s} \quad (4)$$

$$T_D=\frac{T_D f_1+1}{f_1+f_s} \quad (5)$$

Solving for $T_D$ we obtain the following expression:

$$T_D=\frac{1}{f_s} \quad (6)$$

If $N=T_D f_1$=an integer, then the following expression must also be true:

$$f_1=NF_s \quad (7)$$

The two principal requirements for the delay line and the tone frequency are shown in Expressions 6 and 7 above. It can be seen that the delay line is the reciprocal of the tone spacing. Further, the lowest data tone frequency $f_1$ must be an integral multiple of the tone spacing.

An alternative method of obtaining correlation is as follows. Rather than delaying the signal tones by a full cycle and subtracting the two signals, it is possible to obtain a null by delaying the signal tones an odd number of half cycles and then add the undelayed tone to the delayed tone to produce a null pattern. In the case of delaying the tone signal by an odd number of half cycles, the following expression can be written:

$$N'=N+\tfrac{1}{2} \qquad (8)$$

where N' is the number of cycles in the delay period and is equal to an integer plus ½ cycle.

The required delay line length is easily shown to be the same. However, Expression 7 now changes to the following expression:

$$(5a)f_1=N'f_s=(N+\tfrac{1}{2})f_s \qquad (9)$$

Thus, it can be seen that a delay line with a length equal to the reciprocal of the tone spacing is the only one which fulfills the system requirements. The lowest tone frequency which may be used is any multiple of $f_s/2$.

As an actual example of the foregoing, assume the following parameters; $F_1$=605 c.p.s., and $f_s$=55 c.p.s. Thus, the other tone signals can be any one of a family defined by the following expression:

$$A \sin 2\pi(605+55n)t \qquad (10)$$

where $n$ can be any one of several integers.

The change in phase $\Delta\phi$ of the tones of Expression 10 in time interval $\Delta t$ is simply:

$$\Delta\phi=2\pi(605+55n)\Delta t \qquad (11)$$

If $\Delta t$ equal 1/55 second, the reciprocal of the frequency spacing, the change in phase of any tone is:

$$\Delta\phi=2\pi(11+n) \qquad (12)$$

Each tone therefore changes an interval number of $2\pi$ radians, and is exactly the same as it was at the start of the time interval $\Delta t$; that is, the composite of the group of uniformly spaced signal tones has a periodicity to the reciprocal of the frequency spacing, provided the lowest tone of the group is integrally divisible by the frequency spacing. In the case shown by Expressions 10 and 11, with the 55-cycle spacing, the composite wave repeats itself every 1/55 second or 18.18 milliseconds. Thus, if the delay line is made equal to 18.18 milliseconds, the subtraction of the delayed signal from the undelayed signal will produce a null during each bit. Assuming a bit rate of 45.45 bits per second, the period of each bit is 22 milliseconds. Thus, the correlation time is 22—18.18 or 3.82 milliseconds.

Applying the foregoing example to the curves of FIG. 8 the bit rate measured between times $t_0$—$t_1$ is equal to 22 milliseconds and the delay time (measured by the time interval $t_1$—$t_a$) is equal to 18.18 milliseconds. The correlation time of 3.82 milliseconds is equal to time interval $t_a$—$t_1$. During such time interval $t_a$—$t_1$ complete correlation should exist between the undelayed tone of FIG. 7*a* and the delayed composite tone of FIG. 7*b*. Similar correlation exists with respect to all the remaining bits shown in FIG. 8.

FIG. 7 shows structure for providing delay of the received composite signal. More specifically, the dotted block 55' of FIG. 7 corresponds to the block 55 entitled "Synchronizing pulse source" of FIG. 5, and the time base generator 56' corresponds to the time base generator 56 of FIG. 5. The received composite signal, after being converted to a lower frequency, is supplied to correlation subtractor 61 through two parallel paths. One of these parallel paths is through delay line 60, and the other parallel path is through direct circuit connection 66. The delay line 60 has a delay equal to $T_d$. The correlation subtractor 61 function to subtract the delayed signal from the undelayed signal to produce nulls during the correlation periods, as discussed above. Envelope detector 62 responds to the output of correlation subtractor 61 to produce a waveform substantially as shown in FIG. 8*c* with the nulls represented by the dips 68 and 69, for example.

Pulse former 63 is constructed to respond to the output of envelope detector 62 to produce synchronizing pulses such as pulses 70 and 71, which are then supplied to the time base generator 56'. The time base generator 56' can be constructed in a conventional manner to produce the necessary timing signals for the operation of the receiver shown in FIG. 5.

The particular structure shown in FIG. 7 functions to shift the phases of all the tone signals an integral number of cycles.

In those cases where it is desired to shift the phase of each of the tone signals an odd multiple of half cycles, it is necessary to add the delayed and undelayed composite signals to produce nulls. As a specific example of such a phase shift, consider the following case. Assume that the bit rate is 75 bits per second and that the frequency of the lowest tone signal is 605 cycles, which is the same frequency as the example discussed hereinbefore. Since the bit period must be greater than the correlation periodicity of the received signal, the frequency difference must be greater than 75 c.p.s. Such periodicity can be equal to twice the periodicity of the first example discussed hereinbefore wherein the frequency spacing was 55 cycles. Thus, the frequency spacing can be 110 cycles with a periodicity equal 1/110 second. The change in phase in a time interval now becomes $$\Delta\phi=2\pi(605+110n)\tfrac{1}{110}=(11+2n)\pi \qquad (13)$$

where $n$ is an integer.

The phases change, therefore, by an odd number of half cycles for any tone. This indicates that a negative correlation exists during the overlap period and that 180° phase shift must be introduced before the waves can be subtracted. Alternatively, since a 180° phase difference exists between the delayed and undelayed signals, they can be added directly to produce the nulls.

In FIG. 9 there is shown a block diagram similar to that of FIG. 7. However, in FIG. 9 a correlation adder 67 has been substituted for the correlation subtractor 61 of FIG. 7. The resulting waveform supplied to envelope detector 62' will be substantially the same as that produced by the structure of FIG. 7.

It is to be noted that the forms of the invention shown and described herein are but preferred embodiments thereof and that various changes may be made without departing from the spirit or the scope thereof.

I claim:

1. In a communication system for transmitting and receiving a composite signal comprising:

a plurality of tone signals having different frequencies spaced apart by integral multiples of a difference frequency $f_s$ with the lowest tone signal frequency $f_1$ bearing a ratio $N/2$ to $f_s$, where N is an integer;

each of said tone signals being divided into sections of equal and consecutive time intervals known as phasors, with the phasors of each tone signal having phase relationships with a reference phase indicative of the information contained therein;

and the phasors of each of said tone signals having common phase transition points and a repetition rate period greater than the period of the difference frequency $f_s$;

means for producing a synchronizing signal having a frequency equal to the phasor repetition rate, said synchronizing signal producing means comprising;

means for receiving said composite signal, delay means for delaying said composite signal by a time interval $1/f_s$, and;

means for comparing the delayed and undelayed received composite signal to produce signal pulses during the correlation periods of the delayed and undelayed composite signal.

2. A communication system in accordance with claim 1 in which N is always an even integer to produce an integral number of cycles of delay of each of said plurality of tone signals, and in which said comparing means comprises a correlation subtractor to produce nulls during the correlation periods of the delayed and undelayed composite signals.

3. A communication system in accordance with claim 1 in which N is always an odd integer to produce an odd number of half cycles of delay of each of said plurality of tone signals, and in which said comparing means comprises a correlation adder to produce nulls during the correlation periods of the delayed and undelayed composite signals.

4. In a receiver for receiving a plurality of tone signals each divided into time synchronous phasors having common phase transition points;

said tone signals further being separated by integral multiples of a difference frequency $f_s$ with the lowest tone signal frequency $f_1$ bearing a ratio $N/2$ to the frequency $f_s$, and the period of said phasors being greater than the period of the frequency $f_s$;

means for producing a synchronizing signal having a frequency equal to the phasor repetition rate and comprising;

means for receiving said composite signal;

means for delaying said composite signal by a time interval $1/f_s$, and means for comparing the delayed and the undelayed composite signal to produce signal pulses during the correlation periods of the delayed and the undelayed composite signal.

5. A receiver in accordance with claim 4 in which N is always an even integer to produce an integral number of cycles of delay of each of said plurality of tone signals, and in which said comparing means comprises a correlation subtractor to produce nulls during the correlation periods of the delayed and undelayed composite signals.

6. A communication system in accordance with claim 4 in which N is always an odd integer to produce an odd number of half cycles of delay of each of said plurality of tone signals, and in which said comparing means comprises a correlation adder to produce nulls during the correlation periods of the delayed and undelayed composite signals.

References Cited by the Examiner

UNITED STATES PATENTS

| | | | |
|---|---|---|---|
| 3,135,919 | 6/1964 | Heald | 325—320 |
| 3,222,454 | 12/1965 | Losee | 178—88 |

DAVID G. REDINBAUGH, *Primary Examiner.*

S. J. GLASSMAN, *Assistant Examiner.*